United States Patent
Teppo et al.

(10) Patent No.: US 7,693,528 B2
(45) Date of Patent: Apr. 6, 2010

(54) METHOD AND SYSTEM FOR MESSAGE MODIFICATION AND CONTENT SELECTION

(75) Inventors: Ikka Teppo, Espoo (FI); Marko Ahtisaari, Helsinki (FI); Timo Ahopelto, Helsinki (FI)

(73) Assignee: CVON Innovations Limited, London (GB)

( * ) Notice: Subject to any disclaimer, the term of this patent is extended or adjusted under 35 U.S.C. 154(b) by 0 days.

(21) Appl. No.: 12/144,242

(22) Filed: Jun. 23, 2008

(65) Prior Publication Data

US 2009/0017848 A1 Jan. 15, 2009

(30) Foreign Application Priority Data

Jul. 10, 2007 (GB) .................................. 0713388.7

(51) Int. Cl.
*H04W 4/00* (2006.01)
*H04L 29/06* (2006.01)
*H04L 29/08* (2006.01)

(52) U.S. Cl. .................. 455/466; 455/414.3; 455/414.4

(58) Field of Classification Search .................. 455/466, 455/414.1, 414.3, 414.4
See application file for complete search history.

(56) References Cited

U.S. PATENT DOCUMENTS

| | | | |
|---|---|---|---|
| 2006/0194595 A1 * | 8/2006 | Myllynen et al. ........... | 455/466 |
| 2007/0083602 A1 | 4/2007 | Heggenhougen et al. | |
| 2007/0105536 A1 * | 5/2007 | Tingo ....................... | 455/414.1 |
| 2008/0004046 A1 * | 1/2008 | Mumick et al. ............. | 455/466 |
| 2008/0071875 A1 * | 3/2008 | Koff et al. ................... | 709/206 |
| 2008/0243619 A1 * | 10/2008 | Sharman et al. ............... | 705/14 |

FOREIGN PATENT DOCUMENTS

| | | |
|---|---|---|
| DE | 1001984 | 6/2002 |
| EP | 1239392 | 9/2002 |
| GB | 2369218 | 5/2002 |
| WO | WO 2004100470 A1 * | 11/2004 |
| WO | WO 2006/005001 | 1/2006 |

OTHER PUBLICATIONS

Examination Report for counterpart European Patent Application No. 08 153 257.4, issued Jun. 2, 2009.

* cited by examiner

*Primary Examiner*—George Eng
*Assistant Examiner*—Christopher M Brandt
(74) *Attorney, Agent, or Firm*—Barnes & Thornburg LLP

(57) ABSTRACT

Embodiments of the invention are concerned with modification of messages en route to a destination. In one aspect embodiments of the invention provide a method of modifying a message transmitted from a sending party to a receiving party through a communications network, the method including: intercepting the message in the communications network; selecting a plurality of channels of data on the basis of the sending party or the receiving party, each channel comprising a plurality of data items and being accessible by parties in addition to the sending party or the receiving party; applying one or more predetermined rules to at least some of the selected data items so as to identify a data item therefrom; and pending data derived from the identified data item to said intercepted message.

15 Claims, 5 Drawing Sheets

METHOD AND SYSTEM FOR MESSAGE MODIFICATION AND CONTENT SELECTION

CROSS-REFERENCE TO RELATED APPLICATIONS

This application is a U.S. Patent Application that relies for priority under 35 U.S.C. 119, on United Kingdom Application No. GB 713388.7, filed on Jul. 10, 2007, which is incorporated herein by reference.

FIELD OF THE INVENTION

This invention relates to messaging systems, in particular but not exclusively to messaging carried out using wireless terminals, which operate in communications networks.

BACKGROUND OF THE INVENTION

The Short Messaging System (SMS) and the Multimedia Messaging System (MMS) have been used prolifically for personal messaging and are becoming increasingly popular as mediums for communicating advertising information. For example, information services can be configured to generate alerts via SMS or MMS, and these can be modified to include advertisement information; a system configured to provide such a service is described in international patent application having publication number WO01/22748. In addition to transmitting information via these individual and somewhat self-contained messages, information can be transmitted from information sources as Really Simple Syndication (RSS) feeds, audio streams, video streams, or text streams. International patent application having publication number WO01/31497 describes inserting advertisement objects into a video stream, and U.S. patent having publication number U.S. Pat. No. 5,260,778 describes inserting messages such as emergency messages into a video channel. In systems according to both of these publications, the stream of data is modified so as to include a message, thereby notifying the content of the message to a viewer during viewing of or listening to the data stream.

SUMMARY OF THE INVENTION

According to a first aspect of the present invention there is provided a method and systems according to the appended claims.

Thus in comparison to known methods, embodiments of the invention provide a means of modifying a message destined for a specified recipient so as to include a data item selected from a channel of data items. This is quite different to the approaches taken in WO01/31497 and U.S. Pat. No. 5,260,778, which instead describe adding an object such as a message to a stream of data.

In respect of certain channels of data items, a time of transmission of a most recently received data item is identified, and selection of the data item is based on proximity between time of receipt of the message and the identified times of transmission. This aspect is particularly well suited to channels of data comprising stock ticker data, where decisions are to be made on the basis of the most current information. Selection of a data item can alternatively be performed on the basis of a predetermined relationship between individual data items of the plurality of data items, such as previously selected data items from a given channel. This aspect is particularly well suited to channels of data comprising inter-related data items describing, e.g. a story, in respect of which the recipient of a modified message should be sent all of the data items in the channel and in accordance with the order in which the story unfolds. In at least some embodiments the channel of data from which a data item is selected varies per message modification event, so that the predetermined relationship comprises the previously appended data item being different to the data item for use in modifying the presently intercepted message.

Advantageously the selection of a channel of data can be performed on the basis of third party ratings of a given channel, such that for at least one selected channel of data, embodiments of the invention include identifying parties' access to the channel of data and weighting selection of the plurality of channels of data thereon.

When modifying messages, embodiments of the invention include retrieving content from the selected data item; the content can include any one or both of subject of the data item and a link to a network location in the communications network. This provides the modified message recipient with access to further information relating to the data item and thus channel of data items. Furthermore the format of the intercepted message can be modified, e.g. so as to include media-rich content such as audio and/or graphical files, and/or to overcome size restrictions associated with the format of the received message.

In some embodiments modification of the message, in terms of format and content, is performed on the basis of preference data associated with the sending party or the receiving party, or indeed a combination of both. Furthermore, modification can be performed on the basis of predefined profiles with which the sending party or receiving party are associated, or on the basis of preferences of other subscribers of the message modification service, with which the sending party or receiving party are associated. In one arrangement, message modification is dependent on the number of messages received by the receiving party since a previously modified message; message modification is then performed in the event that the identified number exceeds a specified number of unmodified message events.

Further features and advantages of the invention will become apparent from the following description of preferred embodiments of the invention, given by way of example only, which is made with reference to the accompanying drawings.

DETAILED DESCRIPTION OF DRAWINGS

Embodiments of the invention are concerned with modification of data messages en route for a recipient. Specifically, embodiments are concerned with modifying a message so as to include data from a channel comprising a plurality of data items; the data items can be news items relating to a story, where the details of the story are presented over time and in successively transmitted data items, or weather updates, gossip updates, stock market updates, transport schedule updates, video clips or audio clips. In all cases the clips and items are ones of a plurality (or a stream) making up the data channel. The nature of this modification, and the criteria used to make the modification, will be described in detail later in the description, but first a description of the infrastructure needed to support the modification will be presented.

Figure 1:
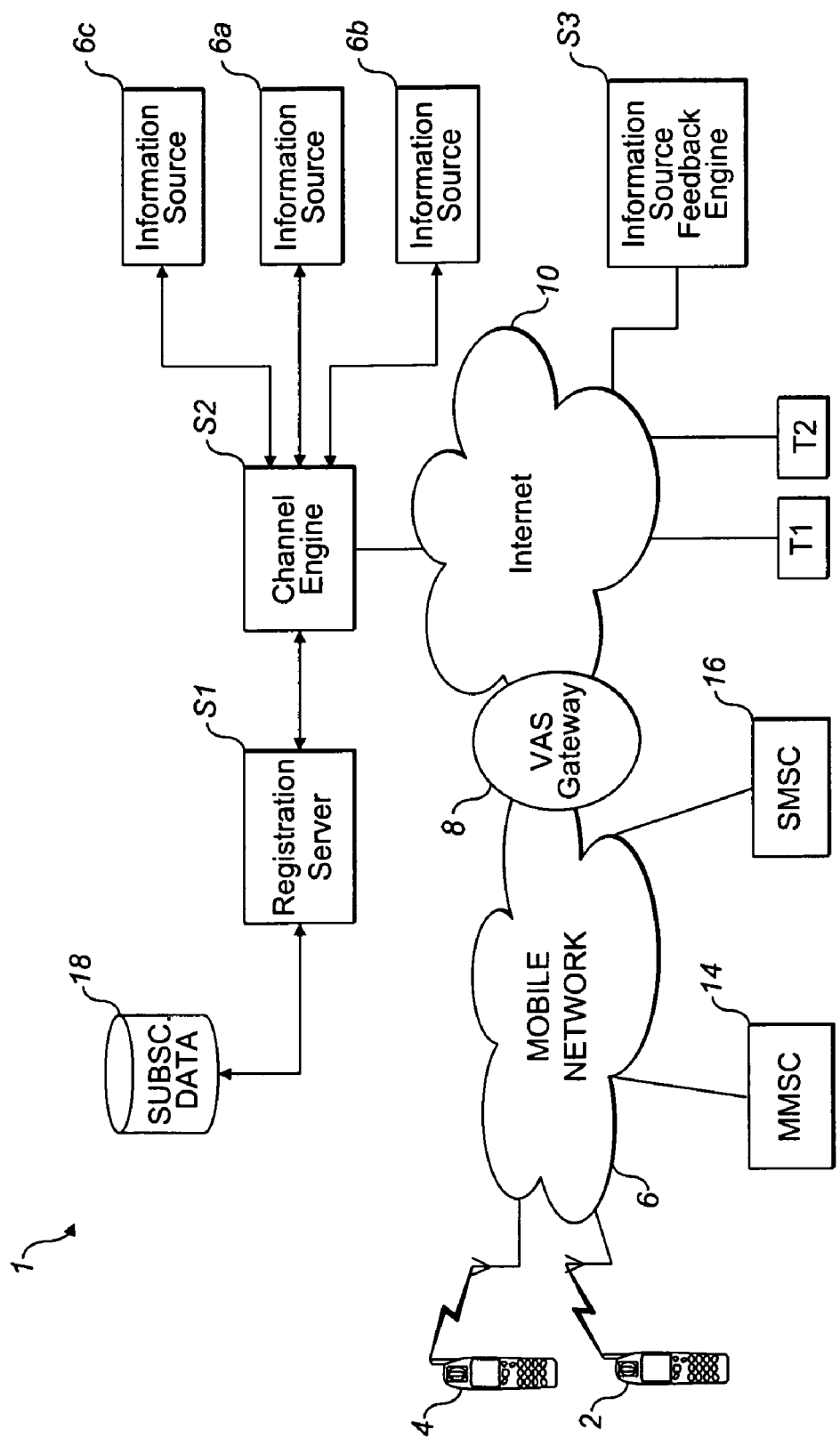
FIG. 1 is a schematic illustration of a communications network arranged in accordance with an embodiment of the invention.
Figure 2:
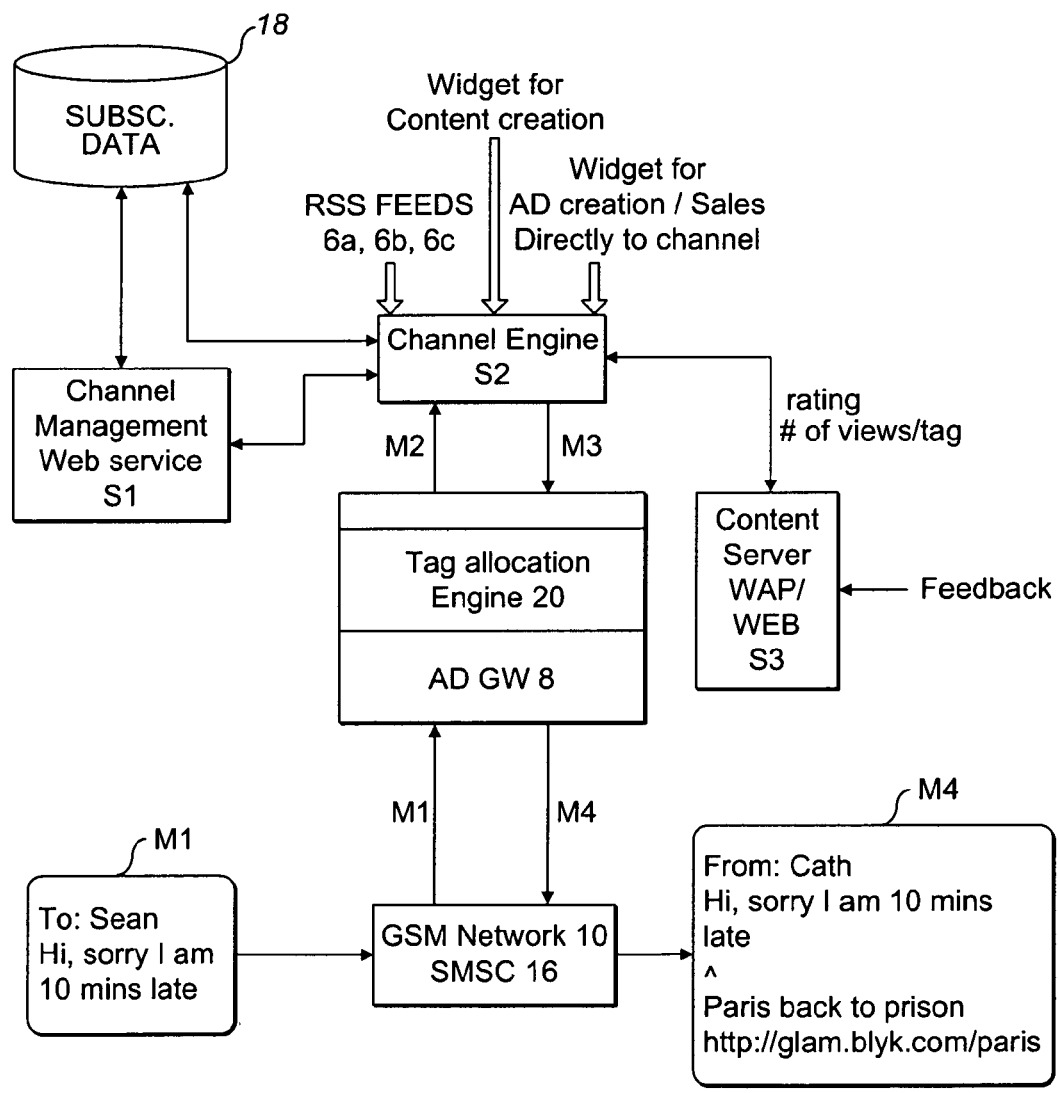
FIG. 2 is a schematic block diagram showing components of a message modification system according to an embodiment of the invention.

FIG. 1 provides an example of a data messaging system 1 within which embodiments of a first aspect of the invention operate and shows examples of various networks through which the messages can be transmitted and modified; FIG. 2 shows an example of a logical interconnection between the components involved in the message modification process.

In the current embodiment the distributed information system 1 comprises a plurality of information providers 6a, 6b, 6c, at least some of which can be arranged to transmit content data to terminals such as terminals 2, 4 over the Internet 10, and from which data items can be retrieved by terminals 2, 4 over the Internet 10. The information system 1 also includes a channel engine S2 arranged to receive the data from the information providers 6a ... 6c, an information source feedback engine S3 arranged to receive user feedback and comments in relation to the content and information transmitted by the information providers 6a ... 6c, and a registration server S1 arranged to process registration requests from subscribers of the mobile network 6, all of which are connected to a network 12 either directly or indirectly (e.g. via the Internet, local area networks (LANs), other wide area networks (WANs), and regional networks accessed over telephone lines, such as commercial information services). The mobile terminals 2, 4 can be adapted to communicate with the various information providers 6a, 6b, 6c via mobile network 6 and an appropriate gateway GW 8, as shown; the terminals 2, 4 can be mobile telephones or personal Digital Assistants (PDAs), laptop computers and the like, and the mobile network 6 can comprise a licensed network portion (such as is provided by cellular networks using e.g. Global System for Mobile Communications (GSM) technology, Wideband Code Division Multiplex Access (WCDMA); Code Division Multiplex Access (CDMA), WiMax) and/or unlicensed network portions (such as is provided by Wireless LANs and Bluetooth technologies). The gateway GW can be a GPRS support node (GGSN) forming part of the mobile network 6.

The mobile terminals 2, 4 can comprise browser and/or bespoke client programs adapted to locate, and access data from, web sites accessible via the public network 10. The browser programs allow users of the terminals 2, 4 to enter addresses of specific web sites, typically in the form of Uniform Resource Locators, or URLs, and are typically adapted to receive and display web and WAP pages; in the event that a given terminal 2 is only capable of processing and displaying WAP pages, translation of a web page can be performed by a device in the network or by suitable translation software running on the device 2. As is known in the art, any given web page can include links nested therein, which, when selected, can provide access to other pages or data such as plain textual information, or digitally encoded multimedia content, such as software programs, audio signals, videos graphics, etc. Accordingly selection of such links results in transmission of further data to the terminals 2, 4. The client applications and programs can be used to display, modify, access and use data from various information sources such as map databases, e-mail services, video and audio services etc.

The registration server S1 can be accessed by a user of the terminal T1, which can be a laptop, personal computer, PDA, mobile phone or smart phone etc., actuating a URL corresponding to the server S1. In addition to standard CPU, memory, data bus, Input/Output ports, data storage, and operating system programs, the server S1 comprises registration software which processes requests to subscribe to the message modification service, while additionally receiving identification and preference data in relation to the subscriber; the server also comprises category selection software, which processes incoming category selection requests; and authentication software, which authenticates incoming requests for access to the category selection software. The data selection, identification and preference data are subsequently stored in the database 18 for subsequent access by the VAS gateway 8.

The registration process can involve the user entering personal information details, such as name, address, terminal details (including capabilities), sex, occupation, interests, etc. Alternatively this information can, at least in part, be gathered automatically from the network 6. In addition to storing and processing registration requests, the server S1 is arranged to display, on request, a plurality of selectable channels, or data feeds, from which the subscriber can select channels of interest. The subscriber can attempt to access the server S1 at any time, causing the authentication software to authenticate or otherwise the access request. Several authentication methods are possible, one being based on the user's mobile phone number or the terminal ID (this being identifiable from, e.g. the header of a message associated with the access request), and another being via a web page having data entry fields corresponding to user name and password. Once authenticated, the user can select one or more channels of interest from the plurality, causing identifier(s) indicative of the selected channel(s) to be stored in the database 18, along with other data associated with this user. Alternatively channel(s) can automatically be associated with the user on the basis of automatic profile matching or buddy profile matching (where a user is identified to have "similar interests" to a registered user and is automatically assigned channels of interest to the registered user).

Examples of channels include weather channel, celebrity and gossip channel, world news channel, software applications channel, games channel and the user can tag each channel as "to be added to sent messages" and/or "to be added to received messages". These selected data channels, along with the user data, are then available for use by the gateway 8, as will be described in more detail below.

Figure 3:
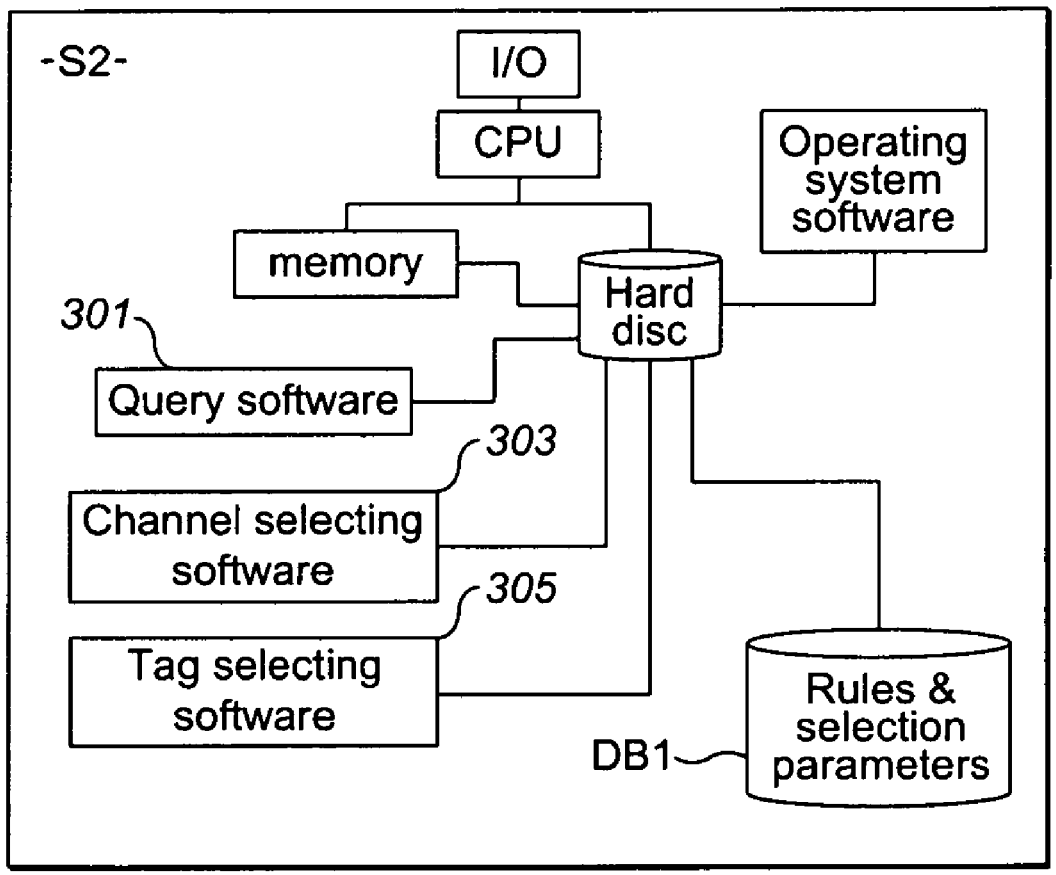
FIG. 3 is a schematic block diagram showing components of the channel engine shown in FIG. 2 according to an embodiment of the invention.

The channel engine S2 is arranged to receive input from a plurality of such data channels, each corresponding to a different information source 6a ... 6c. Typically an information provider 6a ... 6c creates a channel transmission of specific content, which is managed by moderators and/or contributors. The content can be tagged so as to enable reviewers thereof to provide feedback, e.g. in the form of ratings and similar. The tags that accompany the content are designed such that recipients can select a content item and provide feedback in respect thereof, this then being automatically uploaded to the feedback engine S3. Turning to FIG. 3, in addition to standard CPU, memory, data bus, Input/Output ports, data storage, and operating system programs, the channel engine S2 comprises query software 301 and channel selecting software 303. The channel engine S2 is arranged to select a data packet from the plurality of data feeds 6a ... 6c in response to a channel request message M2 received from a device in the network 10. In one arrangement the channel request message M2 comprises data indicative of a user that has subscribed to the data messaging service, and in respect of which preference data are stored in the database 18. Accordingly the query component 301 is arranged to submit a query to the database 18, the query having a query parameter comprising the user identity retrieved from the channel request message M2. In response, the database 18 returns channel identification data from the database 18, these data identifying the channels for which the user has expressed an interest.

Figure 4:
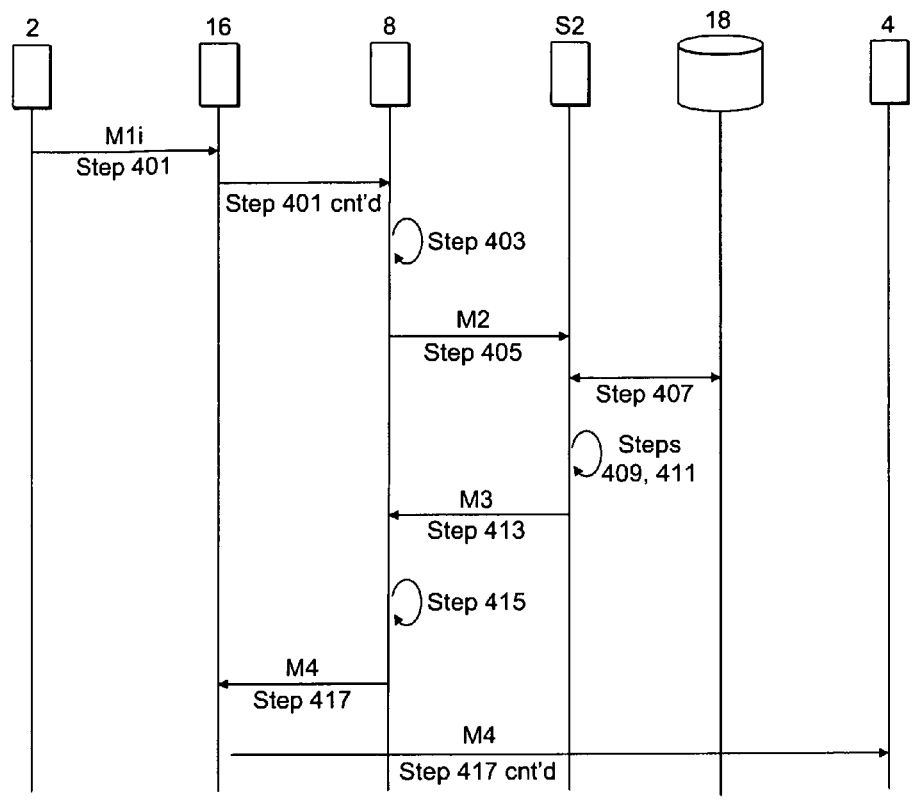
FIG. 4 is a timing diagram showing the flow of messages and processing steps between the components shown in FIG. 1 when operating according to an embodiment of the invention.

The channel selecting software 303 is arranged to lock onto the identified channels and select a data item from one of the channels in accordance with a predetermined selection algorithm stored in DB1, to be described in detail with reference to FIGS. 4 and 5 below, while tag selecting software 305 is arranged to extract content from the selected data item, for example in accordance with message format and message space constraints, and can return the extracted content, together with the identity of the data item from which the content was extracted, within message M3 to the gateway 8.

Turning to FIG. 2, in the current embodiment the gateway 8 hosts a tag allocation engine 20. The gateway 8 is configured to receive a message M1 (SMS, MMS, emails, Instant Message (IM) (e.g. Google Talk), presence updates (Jaiku) etc.) transmitted from a mobile device 2, 4 and that is destined for a recipient in the mobile network 6. Upon receipt, the message M1 is analysed by the gateway 8 to identify the identity of the sender and recipient, and the message M1 is then temporarily stored while a data item is identified for appending thereto. As described above, the gateway 8 is arranged to send the recipient and/or sender identities to the channel engine S2 in message M2; the response from the channel engine S2, namely message M3, is processed by the tag allocation engine 20 so as to identify the content therein, for appending to message M1. Optionally, the channel engine S2 is arranged to request rating data from the feedback server S3 in respect of the channel from which content could be selected. Alternatively, the channel server S2 can be arranged to select data items periodically from a given channel proactively and transmit them, en masse, to the gateway 8 in message M3. In this arrangement, when a message M1 is subsequently received by the gateway 8, the gateway 8 can perform a look-up of the subscriber interests in order to identify which of the locally stored and batch-transmitted data items should be appended to the message M1.

Once a tag has been identified by the tag allocation engine 20, the gateway 80 appends the tag to the message, thereby creating message M4 for transmission to the recipient.

Details of the various channel selection algorithms will now be described with reference to FIGS. 4 and 5. FIG. 4 is a timing diagram showing flows of messages between the various components described above when processing a message according to an embodiment of the invention and FIG. 5 is a diagram showing how the time of receipt of the message M1 is used by the channel selection algorithms for the example of an SMS message being sent and intercepted during transmission to the designated recipient. In this example selection of content for tagging to message M1 is performed on the basis of the recipient identity; however, in cases where the receiver is unknown to the data messaging system 1 or has not subscribed to the service the tag can be based on the preferences of the sender. Alternatively, and assuming both the receiver and sender are subscribers of the service, the content can be selected on the basis of an extrapolated combination of the sender's and receiver's preferences. In the event that neither the sender nor the receiver has opted in for the service, the content can be selected at random, on the basis of ratings, on the basis of group preferences, on the basis of advertiser preferences, or on the basis of operator preferences etc.

Shortly after 12:00 the user of terminal 2 sends an SMS to terminal 4 (step 401). The message M1a is routed to the SMSC 16 and onwards to the gateway 8 in accordance with standard methods, whereupon the gateway 8 identifies the sender and/or recipient of the message as being a subscriber of the data messaging service 1 (step 403). The gateway 8 creates a message M2 comprising the sender and recipient identities (i.e. terminals 2, 4), type of message which is to be modified and the space available in message M1 for a tag (or the size of the content within message M1). Message M2 is then transmitted to the channel engine S2 (step 405), whereupon the query software 301 retrieves, from database 18, details of the channels of interest to the recipient 4 (step 407). For illustrative purposes it is assumed that the recipient has registered an interest with each of data channels 6a, 6b, 6c, these being shown in FIG. 5 as comprising a plurality of data items, or data packets, having been transmitted at a variable rate over a period of time. Data channel 6a relates to stock ticker data; channel 6b relates to a continuous story; and data channel 6c relates to streamed advertisements corresponding to a particular type of product.

In view of the fact that there is a plurality of data channels from which content can be selected, the channel selection software 303 accesses the rules database DB1 so as to determine a channel from which to select a data packet for appending to the message M1. The channel selection rules could specify "weight selection of data from each channel equally" or could factor in prioritization information, for example if the user has classified certain channels as being of "more interest" to them than other channels. In addition, the channel selection rules could be based on user feedback (in the form of clicks or ratings) as per data gathered by the feedback server S3.

A suitable algorithm for accounting for these various factors could be as follows:

$$\text{Selection value} = A/\text{time since data packet transmitted by channel } (t) + B \times \text{Clicks } (c) + C\text{Ratings } (r) + D \times \text{Channel Priority } (cp) + E \times \text{Channel Diversity } (cd) \quad \text{Expression (1)}$$

Where A, B, C, D, E are configurable variables, each of which can be modified so as to change the weighting of the parameters elapsed time (t), feedback (r or c), priority (cp) and channel diversity (cd) when evaluating the selection value. The values can be channel specific, individual, configurable by the operator or subscriber and/or automatically adjustable by a suitable computer program. In addition, the channel selection rules can factor in previously appended tags, for example specifying that the tag selected from a given channel has to be from a channel other than that from which the previously selected tag has been retrieved.

For the case of a "stock ticker" channel, the values of the variables could be set as follows: A=1; B=0; C=0; D=2; E=0 so as to reflect the fact that the selection value is sensitive to frequency of updates to stock data. (For frequent updates the selection value will be high and will decrease as the frequency of receipt of stock data updates decreases.) For the case of a "story" channel, the entire narrative should be sent over time; thus the variables could be set as: A=0; C=1; D=4, reflecting the fact that the elapsed time since the story snippets have been transmitted is unimportant, and that the ratings applied to the story by reviewers are high. In this example the values for variable D (channel priority) are higher for the story channel than for the stock ticker channel. Assuming 10 ms to have elapsed since transmission of a stock update, these parameters can be used to select from the stock ticker or story channel in the following manner:

Selection value (stock)=1/0.1+0+0+2×1+0=12

Selection value (story)=0+0+1×3+4×1+0=7

As a result, a data item from the stock channel is more likely to be selected than is a data item from the story channel. However, if 50 ms have elapsed since transmission of a stock update, the Selection value (stock) is 4; as a result a data item from the story channel is more likely to be selected than is one from the stock ticker channel.

Selection of data within a given channel is performed on the basis of rules that are formulated as a function of the type of data in a channel: for example if the channel, or feed, is a "stock ticker" type of feed, the rule associated with this type of data could specify that the data item having the most recent timestamp should be selected (and never any older data items), whereas if the feed is "story line" type of feed the associated rule could specify that data items should never be skipped and should always be sent in a chronological order. In relation to the advertisement data stream 6c, again the rule could specify that the most recently transmitted packet should be sent.

For this example, in relation to the first tagging event, the channel selection rules specify that channel selection should be performed randomly from the three available channels 6a, 6b, 6c; selection of a channel is subsequently based on an expression similar to Expression 1. Once data from all channels has been selected once, selection can again occur at random. Subsequent selection of a packet within the identified channel is based on the rule associated with that channel.

Figure 5:
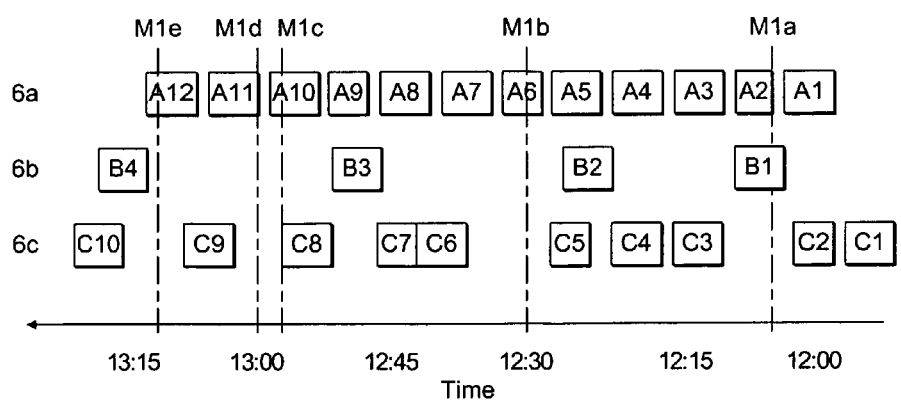
FIG. 5 is a timing diagram showing data packets streamed from the information sources shown in FIG. 1.

Turning to FIG. 5, it can be seen that in relation to message M1a sent around 12:00, packets A1, B1 and C2 are options for tagging to message M1a. Assuming message M1a to be the first message to be modified, message tagging is performed on the basis of rules associated with a first tagging event, which specify that channel selection should be performed randomly from the three available channels 6a, 6b, 6c; in this example channel 6c is selected by the channel selecting software 303. Since packet C2 is the most recently transmitted packet within channel 6c, this packet is selected (step 409); the tag selecting software 305 then extracts data from packet C2 for appending to message M1a. The extraction is performed on the basis of the format of message M1a, this having been notified to the channel engine S2 by data contained within message M2 transmitted at step 405; in this example message M1a is a Short Message (SMS) and it is assumed that the message M1a has sufficient space to accommodate a tag to be inserted therein. Accordingly the tag selecting software 305 parses the packet C2 so as to identify keywords therein, for example using a natural language and summarizing parser or similar. The keywords are then combined according to the available space and on the basis of predetermined grammatical rules, also stored in the database DB1, so as to generate a tag for appending to the message M1a (step 411). Optionally the packets in a given channel can be moderated off-line so as to be suitable for incorporation within message M1a (for example, several differently formatted versions of packet C2 could be created, each for appending to one of SMS, MMS, IM etc.; the appropriate version can then be selected as part of step 411).

Once the tag has been created, it is transmitted to the tag allocation engine 20 running on the gateway 8 (step 413), whereupon the tag allocation engine 20 can verify that the tag can be combined with message M1a, e.g. on the basis of various format and space availability checks. Assuming the checks to proceed successfully, the tag is appended to message M1a so as to form message M4 (step 415), and the modified message M4 is transmitted to the recipient (terminal 4) in accordance with standard methods (step 417). Whilst in this example message M1a is an SMS message, for messages such as MMS, IM, video and email messages, images and audio data can be selected in addition to the tag and/or as the tag.

Figure 6:
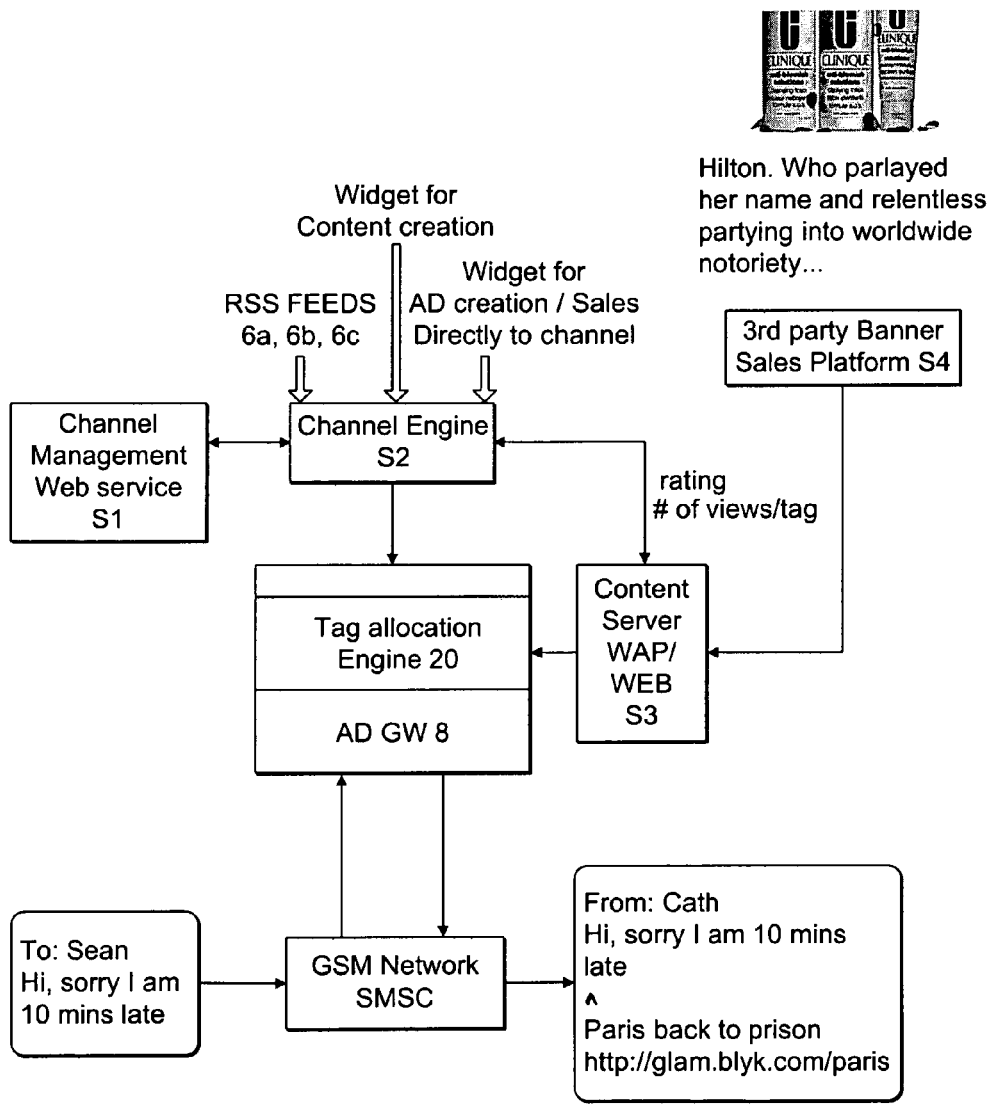
FIG. 6 is a schematic block diagram showing components of a message modification system according to another embodiment of the invention.

Turning to FIG. 6, the feedback server S3 can also receive banner data from a third party banner server S4. The banner can be selected on the basis of the feedback data collected by the feedback server S3 and sent to the tag allocation engine 20 for combining with the content extracted from the channels and passed to the gateway at step 413. It will be appreciated that the size of tag that can be created by the channel engine server S2 when the message M1a is to be modified so as to include a banner and a tag (on the basis of data contained within message M2) will be smaller than tags that can be created when the message M1 is modified so as to include a tag only.

Turning back to FIG. 5, it can be seen that over a period of an hour, further messages are received by the gateway 8 that are destined for a recipient corresponding to terminal 4; each of these messages is assessed for modification according to embodiments of the invention, as will now be described. Considering firstly message M1b received at 12:30, because the previously appended tag was derived from packet C2, the two candidates for message modification at this time are B2 and A6. The user preference and ratings parameters (cp, r) are such that channel 6b is weighted more heavily than channel 6a, so channel 6b is selected. However, whilst packet B2 has been transmitted more recently than packet B1, the rules associated with this channel specify that packets from channel 6b should never be skipped. Since this is the first time a packet has been selected from channel 6b (meaning that packet B1 has not yet been transmitted), packet B1 is selected as forming the basis of the tag for message M1.

Considering next message M1c received just before 13:00, because the previously appended tag was derived from packet B1, the two candidates for message modification at this time are A10 and C8. Whilst the user preference and ratings parameters (cp, r) weight channel 6c more heavily than channel 6a, the parameter relating to channel diversity (cd) causes channel 6c to be selected for appending to message M1c.

In relation to message M1d received at 13:00, since data from all channels have now been selected once, selection of channel is again performed at random; in this case, channel 6b is selected. Applying the rules relating to channel 6b, and since only packet B1 has been sent thus far, packet B2 is selected for appending to message M1d. In relation to message M1e received at 13:10, since the previously appended tag was derived from packet B2, the two candidates for message modification at this time are A12 and C9; the user preference and ratings parameters (cp, r) are such that packet C9 is selected for appending to message M1e.

These selections are summarized in Table 1 below:

TABLE 1

| Time of receiving message | Options for tagging | Added tag |
|---|---|---|
| 12:05 (M1a) | A1, B1 or C2 | C2 "Purchase soft drink A" www.softdrink.com |

TABLE 1-continued

| Time of receiving message | Options for tagging | Added tag |
|---|---|---|
| 12:30 (M1b) | A6, B1 or C5 | B1. "Once upon time", more on the story www.story.com |
| 12:50 (M1c) | A10, B2 or C8 | A10, "Index up 5%" |
| 13:00 (M1d) | A11, B2 or C8 | B2 "there was a king" |
| 13:10 (M1e) | A12, B3 or C9 | C9 "Travel is fun with TravelAgency" www.ordernowtickets.com |

Additional Details and Alternatives

Whilst in the above embodiments messages are described as being tagged only if there is free space in the message M1 transmitted through the network, the gateway 8 could alternatively create an entirely separate message for sending in conjunction with the message M1. In this embodiment the content of message M1 will not be modified, only the delivery, which is to say that the message will have been intercepted en route for the recipient and temporarily stored until such time as the recipient and/or sender has been identified or until the data item has been identified and a message created based thereon. As a further alternative the tag can be added to message M1 by creating a message of a different format so as to accommodate the additional space required. Irrespective of space constraints, the content identified at step 411 and the content of the message M1 received at step 401 could be combined to form a new message of a different format to that of message M1. For example, the content of M1 embodied as an SMS message could be combined with the tag content to create an MMS message.

In addition whilst in the above embodiment every message destined for recipient corresponding to terminal 4 is shown as being tagged, the subscriber data 18 could specify a modification pattern, or rate. For example the modification rate could specify "modify every n message" where n is configurable. In some cases it might be that the validity checks performed by the tag allocation engine 20 fail; in such a case the tag selection software 305 could perform the extraction operation again or the channel selection software 303 could select a different channel (and thus data packet) to form the basis of modification of message M1.

In at least some embodiments the parsing rules applied by the tag selection software 305 can specify that headlines of, and links to, an information item, should be selected from a data packet of a given channel. Such rules could be particularly well suited to channels containing news, weather, gossip etc. The web sites hosting the information retrievable at the links can register the fact that a recipient has accessed their site and update the data stored by the feedback server S4 in relation to that channel.

Whilst the database DB1 is described as storing rules and algorithms for channel and packet selection, together with rules for tag creation, these rules could alternatively be stored on a device located remote from, but accessible to, the channel engine S2.

In addition the channel selecting software 303 could select more than one data item to include in a message: for example so as to include both stock information and some other additional information.

As described above, in addition to selecting data items from a channel to append to the message M1, advertisement data from server S4 can additionally be added to the message M1. Selection of such data can be performed on the basis of explicit selections by a content provider, a network operator or an advertiser having connection with the content provider, and could, for example even include a public announcement service. In the case of advertisement messages the advertisement might be selected on the basis of correlation between the advertisement message and channel preferences of the subscribers. For example if a subscriber's profile includes a sports channel, these additionally appended messages might include advertisements from Nike™ or Adidas™ and the like.

Whilst in the Figures the various server components S1, S2, S3, S4 and gateway 8 are shown as independent of one another, their respective functionality might be combined with that of other servers, or may be further distributed onto disparate devices accessible from the public network 10.

It is to be noted that, whilst in the embodiments above the content data are branded media content, the invention could be applied to many other types of content data. For example, a service according to the invention may be used in tracking the eventual super-distribution of multimedia content across different operators, in which case special tags (e.g. in SMIL files and watermarks in multimedia files), each being associated with an operator, could be used.

The invention claimed is:

1. A method of modifying a messaging service message transmitted from a sending party to a receiving party through a communications network, the method comprising:
   intercepting the messaging service message in the communications network;
   selecting a plurality of channels of data, by a server, based on the sending party or the receiving party, at least one channel being associated with transmission of a temporal sequence of chronological data items and being accessible by parties in addition to the sending party and the receiving party;
   applying one or more predetermined rules to at least some of the selected channels so as to identify at least one data item therefrom;
   appending, in the server, data derived from the at least one identified data item to said intercepted message to generate a modified message including the appended data; and
   transmitting the modified message from the server to the message recipient,
   wherein the at least one identified data item is identified based on a temporal relationship between individual, chronological data items for one of the plurality of selected channels so that chronologically successive data items for that one selected channel are identified.

2. The method of claim 1, further including identifying a time of transmission of the modified message with appended data derived from a most recently identified data item and identifying a data item for a subsequently intercepted messaging service message to the same recipient based on a proximity between that time and a time of interception of the subsequently intercepted messaging service message.

3. The method of claim 1, in which, for at least one selected channel of data, the method includes identifying parties' access to the channel of data and weighting selection of the plurality of channels of data thereon.

4. The method of claim 1, in which, for at least one selected channel of data, the method includes identifying parties' rating of the channel of data and weighting selection of the plurality of channels of data thereon.

5. The method of claim 1, including retrieving content from the data item, said content comprising at least one of subject of the data item and a link to a network location in the communications network.

6. The method of claim 5, including formatting the retrieved content in accordance with one or more predetermined format rules.

7. The method of claim 6, in which the format rules are dependent on the format of the intercepted messaging service message.

8. The method of claim 1, further comprising identifying a number of messages received by the receiving party since a previously modified message and performing the method in the event that the identified number exceeds a specified number of unmodified message events.

9. The method of claim 1, including identifying preference data based on the sending party or the receiving party, as part of selecting the plurality of channels of data based on the sending party or the receiving party.

10. A message modification system for modifying a messaging service message transmitted from a sending party to a receiving party through a communications network, the message modification system comprising:
   an interface arranged to intercept the messaging service message in the communications network;
   a channel selector responsive to data indicative of the sending party or the receiving party so as to select a plurality of channels of data, at least one channel being associated with transmission of a temporal sequence of chronological data items and being accessible by parties in addition to the sending party and the receiving party; and
   a content selector for use in applying one or more predetermined rules to at least some of the selected plurality of channels so as to identify a data item therefrom, wherein the content selector is arranged to derive content from the identified data item and the interface is arranged to append the derived content to said intercepted messaging service message to generate a modified message including the appended data, wherein, the content selector is arranged to identify the at least one identified data item based on a temporal relationship between individual, chronological data items for one of the plurality of selected channels so that chronologically successive data items for that one selected channel are identified; and
   a mechanism for transmitting the modified message including the appended data to the message recipient.

11. The message modification system of claim 10, wherein the channel selector is arranged to identify a time of transmission of a message with appended data derived from a most recently identified data item and identifying a data item for a subsequently intercepted message to the same recipient based on a proximity between that time and a time of interception of the subsequently intercepted messaging service message.

12. The message modification system of claim 10, wherein the content selector is arranged to retrieve a subject of the data item and a link to a network location in the communications network, said network location storing data associated with the retrieved subject of the data item as part of deriving data from the selected data item.

13. The message modification system of claim 10, arranged to format the retrieved content in accordance with one or more predetermined format rules.

14. The message modification system of claim 13, in which the format rules are dependent on the format of the intercepted messaging service message.

15. A content selection system for selecting content for use in modifying a messaging service message transmitted from a sending party to a receiving party through a communications network, the content selection system comprising:
   an interface arranged to receive data indicative of a sending party or a receiving party associated with a messaging service message to be modified; and
   a channel selector responsive to said data indicative of the sending party or the receiving party so as to select a plurality of channels of data, at least one channel being associated with transmission of a temporal sequence of chronological data items and being accessible by parties in addition to the sending party and the receiving party,
   wherein the content selection system is arranged to identify a data item from the plurality of channels based on one or more predetermined rules, said identified data item being used in selecting content to append to said messaging service message transmitted from the sending party to the receiving party to generate a modified message including the appended data, and
   wherein the content selection system is further arranged to identify the at least one identified data item based on a temporal relationship between individual, chronological data items for one of the plurality of selected channels so that chronologically successive data items for that one selected channel are identified,
   wherein the content selection system further comprises a mechanism for transmitting the modified message to the message recipient.

* * * * *